(12) United States Patent
Lu (10) Patent No.: US 8,163,353 B2
(45) Date of Patent: Apr. 24, 2012

(54) FABRICATION OF COPPER-BASED ANODES VIA ATMOSPHORIC PLASMA SPRAYING TECHNIQUES

(75) Inventor: Chun Lu, Monroeville, PA (US)

(73) Assignee: Siemens Energy, Inc., Orlando, FL (US)

( * ) Notice: Subject to any disclaimer, the term of this patent is extended or adjusted under 35 U.S.C. 154(b) by 825 days.

(21) Appl. No.: 12/169,135

(22) Filed: Jul. 8, 2008

(65) Prior Publication Data

US 2010/0009091 A1    Jan. 14, 2010

(51) Int. Cl.
C23C 4/10 (2006.01)
C23C 4/12 (2006.01)
B05D 5/12 (2006.01)

(52) U.S. Cl. ........ 427/453; 427/454; 427/455; 427/115; 427/126.3

(58) Field of Classification Search .................... 427/453
See application file for complete search history.

(56) References Cited

U.S. PATENT DOCUMENTS

| | | | |
|---|---|---|---|
| 3,617,358 A * | 11/1971 | Dittrich | 427/447 |
| 4,476,198 A | 10/1984 | Ackerman et al. | |
| 4,490,444 A | 12/1984 | Isenberg | |
| 4,547,437 A | 10/1985 | Isenberg et al. | |
| 4,582,766 A | 4/1986 | Isenberg et al. | |
| 4,874,678 A | 10/1989 | Reichner | |
| 4,888,254 A | 12/1989 | Reichner | |
| 5,021,304 A | 6/1991 | Ruka et al. | |
| 5,583,285 A * | 12/1996 | Hahn et al. | 73/64.52 |
| 5,916,700 A | 6/1999 | Ruka et al. | |
| 6,294,260 B1 * | 9/2001 | Subramanian | 428/469 |
| 6,589,680 B1 | 7/2003 | Gorte et al. | |
| 6,620,541 B2 | 9/2003 | Fleck et al. | |
| 6,811,904 B2 | 11/2004 | Gorte et al. | |
| 6,844,099 B1 | 1/2005 | Gorte et al. | |
| 6,939,637 B2 | 9/2005 | Gorte et al. | |
| 6,958,196 B2 | 10/2005 | Gorte et al. | |
| 7,014,942 B2 | 3/2006 | Gorte et al. | |
| 2003/0027033 A1 * | 2/2003 | Seabaugh et al. | 429/40 |
| 2005/0058883 A1 * | 3/2005 | Ruka et al. | 429/44 |
| 2007/0148521 A1 * | 6/2007 | Ukai et al. | 429/33 |
| 2007/0160886 A1 | 7/2007 | Digiuseppe | |
| 2007/0243445 A1 | 10/2007 | Digiuseppe | |
| 2008/0003478 A1 | 1/2008 | Greiner et al. | |

(Continued)

FOREIGN PATENT DOCUMENTS

WO    WO 02/37589 A2    5/2002

(Continued)

OTHER PUBLICATIONS

Wennerstrum, et al, "Size Reduction Solutions for Hard-to-Reduce Materials", Powder and Bulk Engineering, Jan. 2002, pp. 1-5.*

(Continued)

*Primary Examiner* — Katherine A Bareford (57) ABSTRACT

A fuel electrode anode (18) for a solid oxide fuel cell is made by presenting a solid oxide fuel cell having an electrolyte surface (15), mixing copper powder with solid oxide electrolyte in a mixing step (24, 44) to provide a spray feedstock (30,50) which is fed into a plasma jet (32, 52) of a plasma torch to melt the spray feed stock and propel it onto an electrolyte surface (34, 54) where the spray feed stock flattens into lamellae layer upon solidification, where the layer (38, 59) is an anode coating with greater than 35 vol. % based on solids volume.

5 Claims, 4 Drawing Sheets

U.S. PATENT DOCUMENTS

2008/0202288 A1* 8/2008 McKechnie et al. ............ 75/346

FOREIGN PATENT DOCUMENTS

WO 2007/048253 * 5/2007

OTHER PUBLICATIONS

Nguyen Q. Minh, Ceramic Fuel Cells, Journal of American Ceramic Society, 1993, 76[3] 563-88.

Rangachary Mukundan, Eric L. Brosha, and Fernando H. Garzon, ECS Sulfur Tolerant Anodes for SOFCs, Electrochemical and Solid State Letters, 7 (1) A5-A7 (2004), The Electrochemical Society, Inc., Los Alamos National Laboratory, Materials Science and Technology Division, Los Alamos, New Mexico 87545, USA.

Shanwen Tao and John T. S. Irvine, ECS Synthesis and Characterization of (La0.75Sr0.25)Cr0.5Mn0.5O3-$\delta$, Journal of The Electrochemical Society, 151 (2) A5-A7 (2004), The Electrochemical Society, Inc., School of Chemistry, University of St. Andrews, KY16 9ST, Scotland, United Kingdom.

Yun-Hui Huang, et al., Double Perovskites as Anode Materials for Solid-Oxide Fuel Cells, Science 312, 254 (2006); DOI: 10.1126/science.1125877, American Association for the Advancement of Science, Washington, D.C.

Seungdoo Park, John M. Vohs & Raymond J. Gorte, Department of Chemical Engineering, University of Pennsylvania, Philadelphia, Pennsylvania 19104, USA, Direct Oxidation of Hydrocarbons in a Solid-Oxide Fuel Cell, Nature Magazine, vol. 404, Mar. 2000.

Hyuk Kim, Seungdoo Park, John M. Vohs, and Raymond J. Gorte, Direct Oxidation of Liquid Fuels in a Solid Oxide Fuel Cell, Department of Chemical Engineering, University of Pennsylvania, Philadelphia, Pennsylvania 19104, USA, Journal of The Electrochemical Society, 148 (7) A693-A695 (2001), The Electrochemical Society, Inc.

C. Lu, W. L. Worrell, R. J. Gorte, and J. M. Vohs, SOFCs for Direct Oxidation of Hydrocarbon Fuels with Samaria-Doped Ceria Electrolyte, Department of Materials Science and Engineering and Department of Chemical Engineering, University of Pennsylvania, Philadelphia, PA 19104-6272, Journal of the Electrochemical Society, 150 (3) A354-A358 (2003).

Raymond J. Gorte, Seungdoo Park, John M. Vohs, and Conghua Wang, Anodes for Direct Oxidation of Dry Hydrocarbons in a Solid-Oxide Fuel Cell, Advanced Materials 2000, 12, No. 19, Oct. 2, pp. 1465-1469.

C. Lu and W. Worrell, Coppering Sintering in Cu-Ceria-SDC Anodes (University of Pennsylvania), Oct. 2004.

H. Kim, C. Lu, W. L. Worrell, J. M. Vohs, and R. J. Gorte, Department of Chemical Engineering and Department of Materials Science and Engineering, University of Pennsylvania, Philadelphia, Pennsylvania 19104, USA, Cu-Ni Cermet Anodes for Direct Oxidation of Methane in Solid-Oxide Fuel Cells, Journal of the Electrochemical Society, 149 (3) A247-A250 (2002), The Electrochemical Society, Inc.

Shung-Ik Lee, Kipyung Ahn, John M. Vohs, and Raymond J. Gorte, Department of Chemical and Biomolecular Engineering, University of Pennsylvania, Philadelphia, Pennsylvania 19104, USA, Cu-Co Bimetallic Anodes for Direct Utilization of Methane in SOFCs, Electrochemical and Solid-State Letters, 8(1) A48-A51 (2005), The Electrochemical Society, Inc.

HTTP://EN.WIKIPEDIA.ORG/WIKI/Solution_Precursor_Plasma_Spray, Apr. 28, 2008.

HTTP://EN.WIKIPEDIA.ORG/WIKI/PLASMA_SPRAY, Plasma Spray, Wikipedia, Apr. 28, 2008.

HTTP://EN.WIKIPEDIA.ORG/WIKI/VACUUM_PLASMASPRAYING, Vacuum Plasmaspraying, Wikipedia, Apr. 28, 2008.

Praxair Surface Technologies, Plasma Equipment Solutions, Tafa Incorporated, Concord, New Hampshire 03301 USA, Apr. 2007.

* cited by examiner

FABRICATION OF COPPER-BASED ANODES VIA ATMOSPHORIC PLASMA SPRAYING TECHNIQUES

GOVERNMENT CONTRACT

The Government of the United States of America has rights in this invention pursuant to Contract No. DE-FC26-05NT42613 awarded by the U.S. Department of Energy.

FIELD OF THE INVENTION

The present invention relates to solid oxide electrolyte fuel cell anodes (fuel electrodes) and techniques to deposit over 35 vol. % Cu based on solids volume within a stabilized zirconia, doped ceria matrix by hot spraying techniques to provide over 35 vol % interconnected porosity and continuous Cu contact. Thus if the anode is 65 vol. % solids, then there is over 0.35×65 vol. % Cu.

BACKGROUND OF THE INVENTION

High temperature solid oxide electrolyte fuel cells (SOFC) have demonstrated the potential for high efficiency and low pollution in power generation. Successful operation of SOFCs for power generation has been limited in the past to temperatures of around 1000° C., due to insufficient electrical conduction of the electrolyte and high air electrode polarization loss at lower temperatures. U.S. Pat. Nos. 4,490,111 and 5,916,700 (Isenberg and Ruka et al. respectively) disclose standard, solid oxide tubular type fuel cells, which could operate at the above described relatively high temperatures. They comprised a solid oxide electrolyte disposed between a fuel electrode (anode) and an air electrode, which was self-supporting or supported by a separate support structure. These layers were deposited by various techniques such as vapor halide deposition. Isenberg, et al., in U.S. Pat. No. 4,547,437 describes in some detail these vapor deposition methods and methods such as slurry spraying/sintering or plasma—flame—spraying to deposit, specifically, an interlayer material over the air electrode, next to the solid oxide electrolyte.

In addition to large-scale power generation, SOFCs which could operate at lower temperatures would be useful in additional applications such as in powering light-duty vehicles. These tubular cells however have a relatively low power density even at 1000° C. and have a potential to bow after curing.

Figure 1:
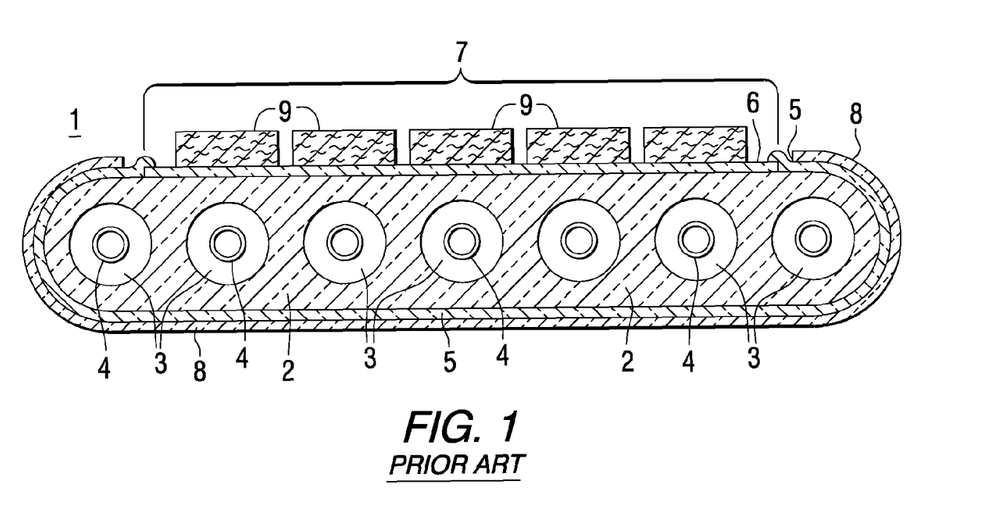
FIG. 1 is a flat cross-section of one type of prior art solid oxide electrolyte fuel cell, showing the flattened air electrode support and interior air feed tubes.

Cells of a flattened parallel sided cross section, that have a number of ribs connecting the adjacent paralleled sides of a lanthanum manganite air electrode extrusion, have achieved substantially higher power density than the cylindrical cells, and are candidates to form the basic element of the next generation of SOFC generators, see FIG. 1 of the drawings. These cells are described in U.S. Pat. Nos. 4,874,678 and 4,888,254 (both Reichner) and U.S. Patent Application Publications U.S. 2007/0160886 A1 and U.S. 2007/0243445 A1 (both Digiuseppe). Air flows within discrete passages that are formed between the ribs and flat sides of the air electrode, preferably through air flow tubes.

Figure 2:
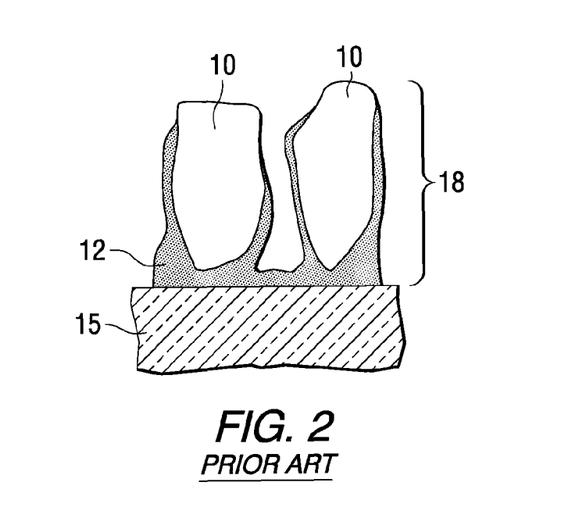
FIG. 2 is a side view in section of an idealized, simplified prior art anode/fuel electrode structure of a solid oxide electrolyte fuel cell, showing nickel particles held in place by electrolyte material.

These flattened cells are referred to as HPDX cells, where HPD indicates "high power density" and X indicates the number of air passages. In HPD cells a lanthanum chromite interconnection is preferably deposited over the entirety of one flat face of the air electrode. A yttria stabilized zirconia electrolyte covers the opposite face and the rounded edges of the air electrode so as to overlap the edges of the interconnection surface but leave most of this surface exposed. An idealized section view of a typical fuel electrode is shown in FIG. 2, from U.S. Pat. No. 4,582,766 (Isenberg et al.), showing large nickel or cobalt particles held in place by partially surrounding electrolyte material. While these metals are preferred, the patent does mention iron, copper and chromium particles. A standard nickel/yttria stabilized zirconia cermet fuel electrode covers the electrolyte except for a narrow margin of electrolyte that surrounds the interconnection. Series electrical connection between cells is accomplished by means of a nickel felt structure a flat face of which is sintered to the interconnection while the raised ribs of which are sintered to the fuel electrode face of the adjacent cell.

A major problem is the cost of nickel for the fuel electrode anode. Also, the fuel electrode anode is sulfur intolerant and can be readily poisoned by ppm level sulfur that is found in many fuel gases derived from coal. This problem was partly solved by Ruka et al. in U.S. Pat. No. 5,021,304, where layers of large nickel particles were covered with fine nickel or cobalt particles coated with cerium oxide or strontium titanate.

Yet another problem, pointed out by Nguyen Q. Minh in "Ceramic Fuel Cells", *J. Am. Ceramic Society*, 76 [3] 563-588, 1993, is that hydrogen, the most common fuel for use in SOFC has a high electrochemical reactivity, providing the following reaction at the nickel anode:

$$H_2+O^{2-}=H_2O+2e^-,$$

hydrogen oxidation at the nickel electrode produced water and adsorption of hydrogen on nickel, followed by the electrochemical reaction:

Raymond J. Gorte et al. in "Anodes For Direct Oxidation of Dry Hydrocarbon In A Solid Oxide Fuel Cell" Advanced Materials [2000], 12, No. 19, October 2, pages 1465-1469 (hereinafter "Gorte et al. article") state that with few exceptions, hydrocarbon-fueled systems depend on a reforming reaction and that the catalytic properties that make nickel an excellent reforming catalyst also prevent it from being a good choice as an electronic conductor in a direct-oxidation SOFC. Ni is used commercially as a hydrocarbon reforming catalyst, where coking is a significant problem if high steam-to-hydrocarbon ratios, typically greater than two, are not maintained. In dry $CH_4$, Ni forms carbon fibers above 700° C., a serious problem since these fibers can completely fill the anode compartment. Attempts have been made to modify the Ni properties, by mixing it with Mn for example. However, the high operating temperatures and the tendency of Ni to catalyze formation of very long graphite fibers in dry hydrocarbons make Ni anodes very susceptible and can cause failure.

The Gorte et al. article further states that the high temperatures needed in SOFC production for achieving a gas-tight electrolyte membrane, preclude the use of low-melting metals for directly substituting Ni. However, replacement of the metal with an electronically conductive metal oxide, having a higher melting point than the metal, is promising because most oxides exhibit low carbon-formation rates; however, the challenge with oxides is to develop materials that are electronically conductive enough to achieve reasonable performance.

The Gorte et al. article focused further research on Cu-based anodes, which is less expensive than Ni, and has a m.p. of 1083° C. vs. 1453° C. for Ni. Problems using Cu in a yttria stabilized zirconia (YSZ) base were noted, because densification of YSZ requires heating to 1300° C. and $Cu_2O$ melts at 1235° C. Methods tried by the Gorte et al. article include aqueous impregnation of $Cu(NO_3)_2$ into a porous YSZ layer followed by calcination, but the anodes produced were said to have poor mechanical strength. Another method added pore formers to one side of a YSZ tape followed by co-sintering to produce pores, then impregnation with a copper solution.

This base Gorte et al. article, published in 2000, appears to have spurred additional interest in Cu based SOFC anodes, for example: U.S. Pat. Nos. 6,589,680 B1; 6,939,637 B2; 6,811,904 B2; 6,844,099 B1; 7,014,942 B2; and 6,958,196 B2 (all Gorte et al.). The base patent of the series, U.S. Pat. No. 6,589,680 B1 utilizes a calcined, porous substrate of zircon fibers and YSZ into which a salt solution of either Cu or Ni is impregnated.

Other articles based on this initial Gorte et al. article, for example, Park et. al, in "Direct Oxidation of Hydrocarbon In A Solid Oxide Fuel Cell" *Nature,* 404, 265-267, March 2000, dealt with the power density values of SOFCs having anodes of 40% wt. % Cu and 20 wt % $CeO_2$ held in place by a YSZ matrix, operating at 700° C. (973K): C. Lu et al. "SOFCs For Direct Oxidation Of Hydrocarbon Fuels with Samaria—Doped Ceria Electrolyte" *J. Electrochemical Soc.* 150 (3) A354-A358 (2003) (hereinafter "Lu:JES Article") a taught $Sm_{0.2}Ce_{0.8}O_{1.9}$ (SDC) electrolyte layer that can operate at 600° C. with hydrogen as fuel, where a porous top SDC layer was used as anode and impregnated with Cu or mixtures of Cu and $CeO_2$ from Cu or Ce nitrate solutions. These layers were made by uniaxially pressing a bilayer of pure SDC powder and SDC powder containing pore formers.

C. Lu et al. in "Copper Sintering In Cu-Ceria—$Sm_{0.2}Ce_{0.8}O_{1.9}$" Mid Pacific Conference Center Meeting Symposium on Electrode Materials. University of Pennsylvania. Oct. 6, 2004, described the power density of Cu-Ceria based SDC anodes, having about 25 wt % Cu, at 700° C. (973K), using a pressing technique of fabrication described in Lu:JES Article, and also a tape casting method. Also, to suppress Cu sintering in the anode tantalum oxide is included in the anode structure but Cu sintering still remained a problem. Also S. Lee in "Cu—Co Bimetallic Anodes for Direct Utilization of Methane in SOFCs" *Electrochem Solid-State Letters,* 8 (1) A48-A51 (2005) attempts to solve Cu anode sintering problems over 800° C. (1073K) and taught Cu—Ni alloy anodes superior to Ni cermets but that a Cu—Co bimetallic system was even more impressive in countering carbon build up when exposed to n-butane in a SOFC operating at 700° C. (973K). Tape casting techniques were used to fabricate the anode.

In the area of planar fuel cells as differentiated from HPDX fuel cells, contact layers disposed between a conducting current take off plate and at least one of the electrodes have been discussed in U.S. Pat. Nos. 6,074,772 and 6,620,541 B2 (Hofer et al. and Fleck et al.). Other types of solid oxide fuel cells, can operate at higher current density than cylindrical cells, with improved packing density; the so called triangular or Delta X cells. However, they share the same anode problems. These triangular cells would also benefit from lower cost anodes and lower operating temperatures. Some examples of these triangular type solid oxide fuel cells include U.S. Pat. Nos. 4,476,198; 4,874,678 (FIG. 4); and U.S. Patent Application Publication U.S. 2008/0003478 A1 (Ackerman et al.; Reichner, and Greiner et al. respectively.)

As is obvious from the previous background, under today's energy conservation efforts, there is a need for lower operating temperature solid oxide fuel cells which could include improved, less expensive anodes not subject to sulfur or carbon fouling or metallic sintering. These sulfur and carbon problems date back at least fifteen years. Therefore, it is one of the main objects of this invention to provide new anode systems and new methods of producing those anodes. It is another of the main objects of this invention to provide lower cost anodes, operable at lower temperatures and resistant to metal sintering.

SUMMARY OF THE INVENTION

The above mentioned needs and described objectives are met by providing a method of depositing a fuel electrode anode onto a solid oxide electrolyte surface comprising the steps: (1) providing a solid oxide electrolyte surface; (2) mixing copper powder, selected from the group consisting of elemental copper and copper coated graphite, with a solid oxide electrolyte capable of passing/conducting oxygen ions at temperatures below 1000° C. to provide a spray feedstock; and (3) introducing the spray feedstock into a plasma jet of a plasma torch to melt the spray feedstock and propel it onto the solid oxide electrolyte surface, where on contact with said surface droplets of the spray feedstock flatten into flattened lamellae, creating an anode coating having pore voids between the flattened lamellae upon solidification, providing an anode coating with greater than 35 vol. % Cu based on solids volume.

The invention also resides in a method of depositing a fuel electrode anode onto a solid oxide electrolyte surface comprising the steps: (1) providing a solid oxide electrolyte surface; (2) mixing copper powder with a solid oxide electrolyte capable of passing/conducting oxygen ions at temperatures below 1000° C.; 3) oxidizing the mixture in air at temperatures below 800° C.; (4) grinding the oxidized powder, to provide a spray feedstock; and (5) introducing the spray feedstock into a plasma jet of a plasma torch to melt the spray feedstock and propel it onto the solid oxide electrolyte surface, where on contact with said surface droplets of the spray feedstock flatten into flattened lamellae, creating an anode coating having pore voids between the flattened lamellae upon solidification. (6) reducing the coating, providing an anode coating with greater than 35 vol. % Cu based on solids volume, over 35 vol. % interconnected porosity, and continuous electrically conducting Cu contact.

BRIEF DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Referring now to FIG. 1, a prior art flattened tubular type solid oxide fuel cell is shown as 1, this flattened cell will be described in some detail as it is an advanced type fuel cell where the new anode material of this invention might well be used. This flattened cell is axially elongated and contains a porous, air electrode 2, self-supporting as shown, having a plurality of interior gas feed chambers 3 through its cross-section and parallel to its axial length. The air electrode top surface is flat. The gas feed chambers may, optionally, contain gas feed tubes 4, in which case the chambers 3 would be closed at one end. The gas exiting from the feed tube, into the closed end of chamber 3 would then pass through the space along the cell length to exhaust at the open end of the chamber. The air electrode 2 may be a chemically modified oxide or mixture of oxides including $LaMnO_3$, $CaMnO_3$, $LaNiO_3$ and $LaCrO_3$. A preferred material is $LaMnO_3$, doped with Sr.

An interconnection 6, about 20 micrometers to about 100 micrometers (0.02 millimeters to 0.1 millimeters) thick, and typically made of lanthanum chromite doped with calcium, strontium, or magnesium, continuously covers a wide, major segment 7 along the top portion of the air electrode defining the air electrode top surface, and continues down the axial length of the air electrode. The interconnection material 6, which is a non-porous ceramic, can be as wide as the width of the air electrode, and is disposed into a discontinuity of the fuel electrode. This substantial interconnection coverage is from about 60% to about 95%, of the air electrode cross-sectional width. The interconnection material 6 must be electrically conductive and chemically stable both in an oxygen and in a fuel environment.

The remaining balance of the porous air electrode surface supports and is covered by a gas-tight, non-porous, solid electrolyte 5, typically yttria stabilized zirconia, about 20 micrometers to 100 micrometers (0.02 millimeters to 0.1 millimeters) thick, which is shown covering the edges of the interconnect 6 in FIG. 1 to enhance gas sealing. A porous fuel electrode anode 8 contacts the electrolyte, and covers substantially the whole portion of the electrolyte. A typical anode is about 30 micrometers to 300 micrometers (0.03 millimeters to 0.3 millimeters) thick. A material (not shown) which is of the same composition as the anode, may be deposited over the interconnect 6. This material is typically nickel zirconia or cobalt zirconia cermet and is similar in thickness to that of the anode.

Also shown are fibrous felt strips 9 that are high-temperature stable. By "high-temperature stable" is meant that the fibrous strips contain fibers or other materials that have melting points greater than their 1000° to 1200° C. processing temperature. The strips 9 are from 80% to 97% porous (3% to 20% of theoretical density). The felts must be electronically conducting and capable of remaining relatively flexible during fuel cell generator operation, to act as a cushion to any vibration, and to act to relieve stress and permit small displacements between the ceramic portions of the fuel cell stack during operation and cycling.

A more detailed idealized cross-section of a prior art fuel cell electrode anode is shown in FIG. 2. As mentioned previously, the preferred electrolyte 15 material is stabilized zirconia. The zirconia can be stabilized with a number of elements, as is well known in the art, such as Ce and Sc, but scandia stabilized zirconia is preferred as it has excellent oxygen ion mobility. A prior preferred composition was $(ZrO_2)_{0.90}(Y_2O_3)_{0.10}$. The conductive material 10 that forms the anode electrode 18 in FIG. 2 is nickel or cobalt using particles about 1 micrometer to about 5 micrometers (0.001 millimeters to 0.005 millimeters) diameter, since it is difficult to make larger particles adhere to the electrolyte. A preferred electrode thickness is about 50 micrometers to about 200 micrometers (0.05 millimeters to 0.2 millimeters) thick. The metal electrode particles were applied to the electrolyte as a powder layer in many different ways, including slurry dipping, spraying, and tape transfer. Electrolyte material holding the conductive material is shown as 12.

Figure 3:
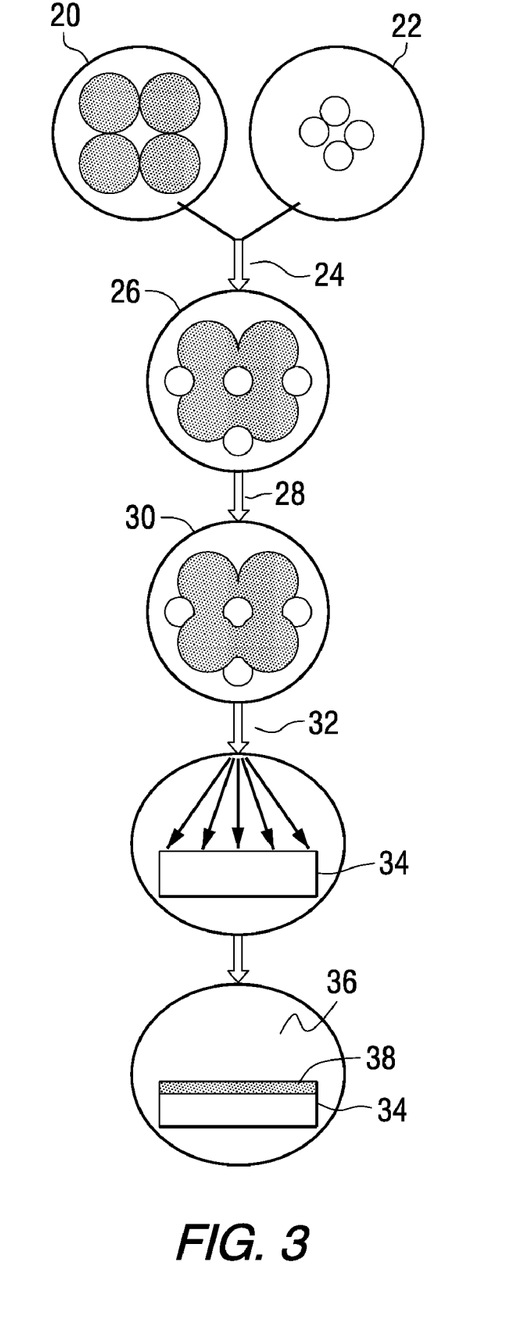
FIG. 3 which best illustrates the invention, is a flow chart of the process for depositing a copper based fuel cell anode on a solid oxide electrolyte surface.

With this background we refer now to FIG. 3 which is a flow chart of the process of this invention for depositing a fuel electrode anode onto a solid oxide electrolyte surface. Copper particle powder 20, preferably metallic/elemental Cu, is mixed with solid oxide electrolyte particle powder 22 in mixing step 24. Preferably the Cu-electrolyte mixture 26 is oxidized, loosened and sieved in one or a series of steps 28 to provide a spray feedstock 30 of copper oxide and electrolyte. The preferred ratio of spray feedstock 30 is from 1-2 parts by volume CuO per 1 part by volume electrolyte, preferably 1.5 parts by volume CuO per 1 part by volume electrolyte. The spray feedstock is introduced into a plasma jet 32 of a plasma torch (described later) to melt the spray feedstock and propel it onto a solid oxide electrolyte surface 34 where the spray feedstock flattens into flattened lamellae (shown in FIG. 5). The coated electrolyte surface is then preferably inserted into a heated reducing atmosphere 36 to provide a Cu plus electrolyte anode coating 38 having over 35 vol. % interconnected porosity preferably 35-65 vol. % interconnected porosity over the electrolyte surface 34. For purposes of this application, for simplicity. Cu-10S1CeSZ is equivalent and interchangeable with Cu—ScSZ.

Figure 4:
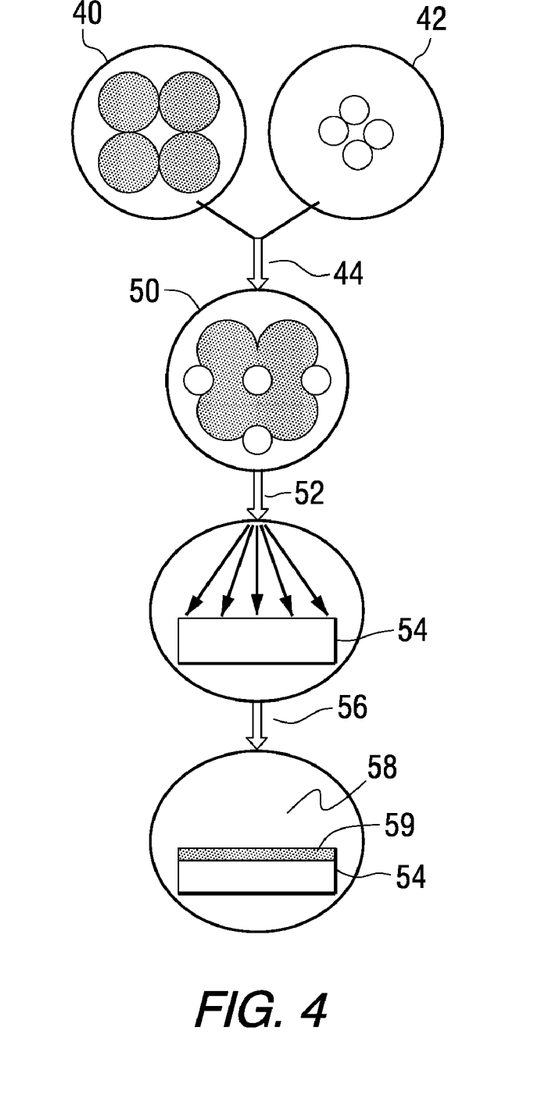
FIG. 4 is a flow chart of an alternate process using copper coated graphite to deposit a copper based fuel cell anode on a solid oxide electrolyte surface.

In a related, very similar process, shown in FIG. 4, Cu-coated graphite is utilized to generate additional porosity in the finished anode. Here Cu-coated graphite (Cu—C) particle powder 40 is mixed with solid oxide electrolyte particle powder 42 in mixing step 44, to provide a spray feedstock 50 of copper-coated graphite and electrolyte. The preferred ratio is from 1 to 2.5 parts by volume Cu—C per 1 part by volume electrolyte. The spray feedstock 50 is introduced into a plasma jet 52 of a plasma torch to melt the spray feedstock and propel it onto a solid oxide electrolyte surface 54 where the spray feedstock flattens into flattened lamellae (shown in FIG. 6). The coated electrolyte surface is then preferably oxidized in step 56 at from about 600° C. to 850° C. to remove graphite, open porosity, and provide CuO. The oxidized coated electrolyte is inserted into a heated reducing atmosphere 58 to convert CuO back into metallic Cu, provide a Cu plus electrolyte anode coating 59 having over 35 vol. % generally over 45 vol. % and up to 65 vol. % interconnected porosity over the electrolyte surface 54.

In both cases, the particle size range of either metallic Cu particle powder or CuC particle powder will range from 5 micrometers to 150 micrometers (0.005 millimeters to 0.150 millimeters) preferably from 44 micrometers to 74 micrometers (0.044 millimeters to 0.074 millimeters). Also, while most of the Examples below relate to a preferred electrolyte formulation 10Sc1CeSZ which stands for $(Sc_2O_3)$ 0.1 $(CeO_2)$ 0.01 $(ZrO_2)$ 0.89, the invention is applicable to other developed and to-be-developed solid oxide electrolytes that can transport oxygen ions over about 700° C. or possibly lower. Some useful electrolytes include stabilized zirconia including $(Sc_2O_3)_x(Y_2O_3)_y(CeO_2)_z(ZrO_2)_{1-x-y-z}$, where x=0 to 0.2, y=0 to 0.2, z=0 to 0.3; and $(Ln_2O_3)_x(CeO_2)_{1-x}$, where Ln=Gd, Sm and La, with x=0.05 to 0.30.

As to plasma spraying. The material to be deposited (spray feedstock)—typically as a powder, sometimes as a liquid, suspension or wire—is introduced into a plasma jet, emanating from a plasma torch. In the jet, where the temperature is on the order of 10,000K, the material is melted and propelled towards a substrate. There, molten droplets flatten, rapidly solidify and form a deposit. Commonly, the deposits remain adherent to the substrate as coatings; free-standing parts can also be produced by removing the substrate. There are a large number of technological parameters that influence the interaction of the particles with the plasma jet and the substrate and therefore the deposit properties. These parameters include feedstock type, plasma gas composition and flow rate, energy input, torch offset distance, substrate cooling, etc. The deposits consist of a multitude of pancake-like lamellae called "splats," formed by flattening of the liquid droplets. Between these lamellae, there are small voids, such as pores, cracks and regions of incomplete bonding. As a result of this unique structure, the deposits can have properties significantly different from bulk materials. This spray technique is mostly used to produce coatings on structural materials. Such coatings provide protection against high temperatures, corrosion, erosion, wear; they can also change the appearance, electrical or tribological properties of the surface, and replace worn material.

EXAMPLES 1-4

Three CuO-10 Sc1 Ce SZ mixtures were prepared with V-blending techniques and designated as APS (atmospheric plasma spray) Stock Samples CuOZ1, CuOZ2, CuOZ2-1 and CuOZ3. The ratio between CuO and ScSZ was 60 to 40 in volume. Commercial copper oxides with different particle size distribution were ordered from two commercial suppliers, Alfa Aesar (a Johnson Matthey Company) and Mallinckrodt Baker, Inc., and were used to prepare CuOZ1, CuOZ2, and CuOZ2-1, respectively. The average particle size for CuOZ1, CuOZ2 and CuOZ2-1 were about 3.6-16.7 micrometers for CuOZ1, and 3.8-37 micrometers for CuOZZ and CuOZZ-1.

The CuOZ3, on the other hand, was prepared, as EXAMPLE 4, from metallic Cu supplied by Praxair Surface Technologies, Inc. instead of CuO. The blended Cu—ScSZ mixture of this Sample was oxidized in air in two stages at 600° C. and about 800° C., to convert metallic Cu to copper oxide. The oxidized powder was ground and sieved through 100 mesh screens after each oxidation step to produce the CuOZ3 Sample.

All the feeding stocks were then sprayed onto stainless steel substrates by using selected gun power (from a plasma spray gun described below), to form free-standing specimens. As-sprayed specimens were then analyzed with ICP (Inductively coupled plasma spectrometry) for chemical composition. Part of the specimens were also reduced at 800° C. for 10 hrs and examined with SEM (Scanning electron microscope) equipped with EDS (Energy dispersive spectrometry) for morphology and element distribution analysis.

These four examples were used as a screening process to discover the best material and processes. Table 1 below summarizes the data of CuO—ScSZ Samples from 4 APS trials, in which CuOZ1, CuOZ2 and CuOZ2-1 are less desirable comparative examples. Within the study scope, two parameters primarily dictated the properties of the sprayed CuO—ScSZ Samples. First was the particle size of CuO in the feeding stock. For instance, for an applied identical gun power of 16 kW, increasing the CuO particle size from small (CuOZ1; 90%<16.7 μm) to medium (CuOZ2; 90%<37 μm) is very instrumental for preserving more copper in the sprayed samples. Consequently Cu content, based on ICP analysis increased from 12.98% (CuOZ1) to 26.29% (CuOZ2). Using the same CuOZ2 mixture, lowering gun power from 16 kW (CuOZ2) to 8 kW (CuOZ2-1) raises the Cu content further up to 34.10%. Unfortunately, SEM observation for CuOZ1, CuOz2 and CuOZ2-1 suggests non-uniform distribution of the pores and lack of porosity with the highest of the three being CuOZ2-1.

As a result, another sample—CuOZ3 was prepared and sprayed using gun power of 10 kW. The amount of Cu in the as-sprayed CuOZ3 was 58.68 wt % based on solids, so that the reduced CuOZ3 shows sheet resistance of 0.095 mΩ and more importantly 46.5 vol. % porosity determined from mercury intrusion measurement. In Table 1, all elemental Cu, Sc, Zr, Ce and O values are in atomic %, of course trace elements are also present.

TABLE 1

Analysis data of CuO—ScSZ samples from 4 trials sprayed or stainless steel, where composition of Cu, Sc, Zr, Ce and O are in atomic % where trace elements are also present.

| APS stock | CuOZ1** | CuOZ2** | CuOZ2-1** | CuOZ3 |
|---|---|---|---|---|
| CuO stock | Alfa Aesar | J. T. Baker | J. T. Baker | Lab-made |
| Particle size | Small | Medium | Medium | Large |
| Gun Power (kW) | 16 | 16 | 8 | 10 |
| Cu | 12.98 | 26.29 | 34.10 | 58.68 |
| Sc | 5.44 | 4.32 | 3.80 | 1.63 |
| Zr | 53.12 | 43.05 | 36.94 | 16.87 |
| Ce | 1.06 | 0.89 | 0.71 | 0.38 |
| O | 27.40 | 23.85 | 23.22 | 21.90 |
| Porosity* | very dense | Dense | Porous | 46.5% |
| Resistance (mΩ)* | Insulated | Insulated | 0.28 | 0.095 |

*Test performed on reduced samples
**Comparative Examples

Several SEM images of a reduced CuOZ3 sample, in secondary electron and back scatter image clearly shows open porosity and distinguished pore morphologies. Based on their appearance, pores in CuOZ3 can be divided into two types. One is large pores likely originated from the orifices between sprayed splats, and the other is tiny pores probably due to the reduction CuO to Cu. The combination of these two type pores gives rise to 3D porosity of 46.5 vol. % listed in Table 1 For CuOZ3, the much preferred composition. EDS element mapping of Cu, displayed a well connected Cu network responsible to the low sheet resistance of 0.095 mΩ. The Cu network was intimately supported by the zirconia skeleton as indicated in Zr mapping. This interwoven feature is preferred since in reducing environment Cu is easier to sinter compared with Ni, and the zirconia skeleton is able to constrain Cu migration and minimize its sintering as a consequence. Additionally, the zirconia skeleton should also tailor the coefficient of thermal expansion of the prepared Cu—ScSZ composites to such as degree that the Cu—ScSZ composites become compatible with ScSZ electrolyte. In all cases the preferred range of anode coating is from about 20-200 micrometers (0.02 to 0.2 millimeters).

The plasma spray apparatus used was a No. 3710 from Praxair Surface Technologies. This was used with an SG 100 spray gun and a model 1264 precision feeder all described in detail in Brochure "Plasma Equipment Solution" Praxair/Taqfa, printed USA 04-2007. The SG 100 spray gun operates at energy levels up to 80 kW in any of three modes—subsonic, Mach I and Mach II—the gun is suitable for a wide range of applications requiring metals, carbides or ceramics. The Model SG-100+s unique design accepts internal and/or external powder injection at a variety of injection angles and features anodes and cathodes renowned for long service life. Internal injection provides the most efficient spraying condition and generates the highest-quality coatings. It also ensures maximum powder particle entrainment at the point of highest energy within the plasma stream by injecting the powder closest to the highest arc temperatures, providing optimum energy transfer and particle velocity, which combine to create high powder deposition efficiencies, as stated in the Brochure.

EXAMPLE 5

Lab made APS Stock CuOZ3 powder, prepared as in EXAMPLE 4 above, was used to prepare Cu containing anodes on symmetric and tubular solid oxide fuel cell samples where the anodes were atmospheric plasma sprayed on scandia stabilized zirconia 10Sc1CeSZ, that is $(Sc_2O_3)_{0.1}(CeO_2)_{0.01}(ZrO_2)_{0.89}$ fuel cell, electrolyte sections.

As in EXAMPLE 4 but more specifically described here 300 g copper powder (Cu-159-1 from Praxair Surface Technology) and 228 g 10Sc1CeSZ powder (A1919 from Daiichi) were blended for 30 minutes using a V blender. The mixture was then transferred into alumina boats and was heat treated/oxidized according to the following profile: 5° C./min to about 600° C.; dwell for 4 hours; 5° C./min to 600° C.; dwell for 10 hours; 5° C./min to cool down. The mixture was then loosened up and sieved through 100 mesh, and placed back to the alumina boats and exposed to another heat treatment: 5° C./min to 350° C.; dwell for 4 hours; 5° C./min to 800° C.; dwell for 10 hours; 5° C./min to cool down. The treated mixture was then loosened and sieved through 100 mesh again to produce the copper oxide and EL feeding stock.

Both symmetric and tubular Cu-containing cells were used in this Example, and their counterparts, that is, standard Ni—YSZ anode cells were also prepared for comparison purpose. For tubular-cell production, air electrode tubes were sprayed with interconnection and then coated with composite interlayer and calcined at 1200° C. for 1 hour. Then, 10Sc1CeSZ electrolyte (EL) was sprayed onto the tubes, and then sintered at 1350° C. for 6 hours to prepare the substrates for depositing an anode layer. 10Sc1CeSZ plates (~1.7 min thick) were used for symmetric cell fabrication. The feeding stock of CuO—ScSZ developed previously as Sample CuOZ3 was plasma sprayed onto tube and plate substrates, respectively using a plume temperature of between about 2000° C. to 3000° C. and as feed rate of 1 to 15, preferably 8 g/min at a gun power of 10 kW.

The CuOZ3 anodes were reduced at 800° C. for 8 hours in cover gas to convert CuO to Cu. The microstructure of the Cu-based anodes was studied with a SEM equipped with an energy dispersive X-ray spectrum, and their electrochemical performance was measured in 5% $H_2$+95% $H_2O$ fuel environment. SEM images of a tubular cell with a reduced CuOZ3 anode, both secondary electron and back scatter images clearly showed a porous anode layer attached to the dense EL. The porous anode had open porosity and distinguished pore morphologies. Based on their appearance, existing pores could be divided into two types. One was large crack-liked pores likely originated from the orifices between sprayed splats, and the other was tiny pores probably ascribed to the reduction of CuO to Cu. This observation is consistent with the previously reported data in EXAMPLE 4 on free-standing films possessing 3D porosity of ~46.5 vol. %. EDS element mapping of Cu, showed CuO—ScSZ, a well connected Cu network responsible to the low sheet resistance of 0.095 mΩ. The Cu network was intimately supported by the zirconia skeleton as indicated in Zr mapping. This interwoven feature is preferred since in reducing environment Cu is easier to sinter compared with Ni, and the ScSZ skeleton is able to confine Cu migration and minimize its sintering. Additionally, the ScSZ skeleton also tailors the coefficient of thermal expansion of the prepared CuO—ScSZ composites to such as degree that the Cu—ScSZ composites become compatible with EL, as self evidenced by produced tubular cells.

Figure 5:
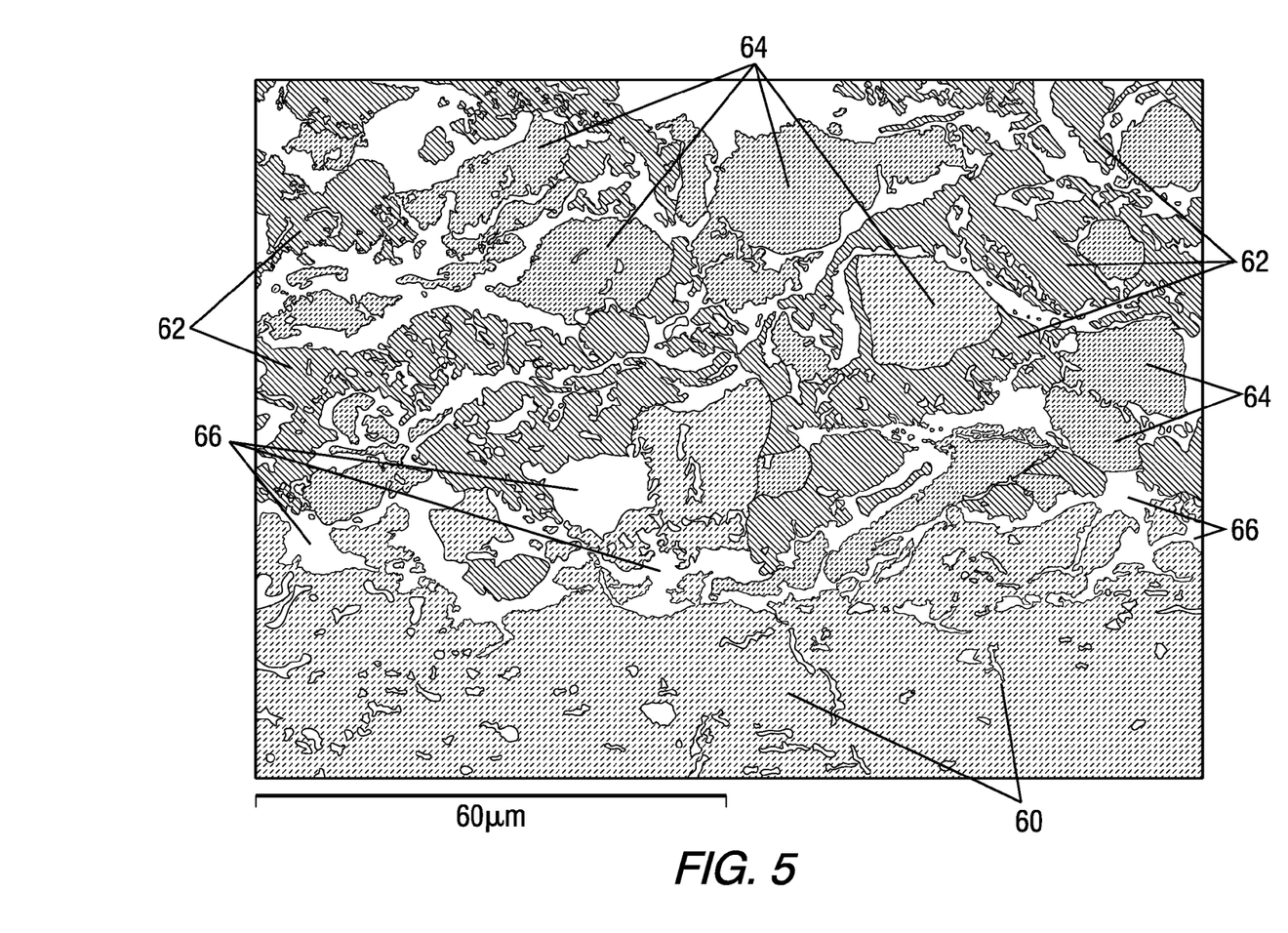
FIG. 5 is a schematic cross-section of a reduced Cu-10Sc1CeSZ metal-ceramic (=Cu—ScSZ) anode material having Cu as a starting material, deposited on solid oxide electrolyte material.

FIG. 5 illustrates a combined composite schematic cross-sectional representation of the anode of Example 5 based on SEM images. In FIG. 5 the electrolyte surface is shown as 60, Cu as interconnected, widely dispersed, flattened lamellae (diagonal hatch) 62, zirconia as interconnected, widely dispersed skeleton lamellae 64 and widely dispersed internal pores as 66 (white areas). Similarly to EXAMPLE 4, porosity was about 46 vol. % and Cu content about 58% in the as-sprayed CuOZ3, corresponding to 55.6 vol. % Cu in solids of the reduced CuOZ3. As can be seen, there is very substantial interconnected porosity, flattened lamellae of Cu and zirconia and continuous Cu contact. A 60 micrometer comparative length is also shown.

EXAMPLE 6

Figure 6:
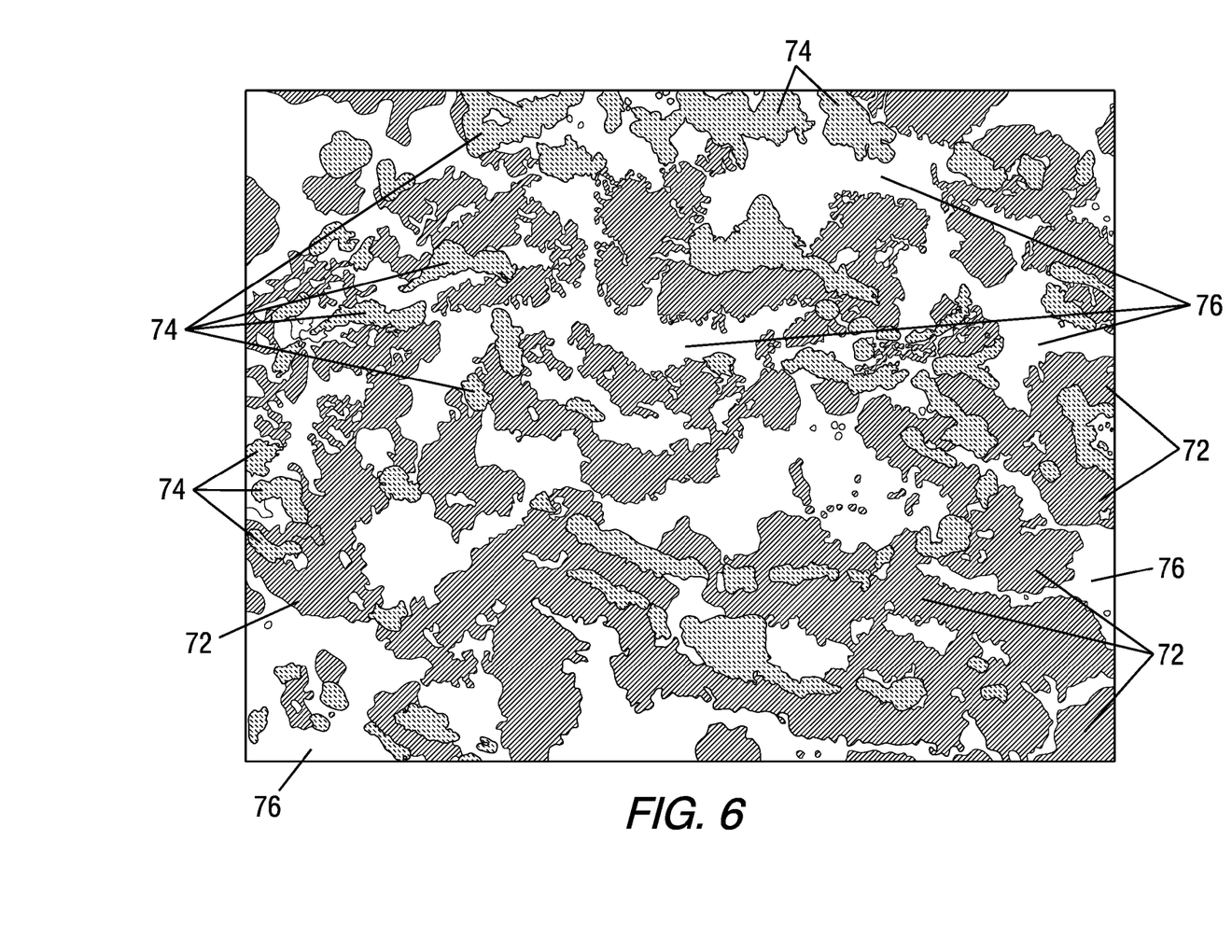
FIG. 6 is a schematic cross section of a reduced Cu-10Sc1CeSZ metal-ceramic anode, having copper coated graphite as a starting material.

In this EXAMPLE 6 a graphite component was used which could be "burned out" creating even more porosity where it might be desired. Here Cu-coated graphite is included to generate porosity by the removal of graphite in the sprayed composites, and to create a Cu network for electron conduction. Copper-coated graphite (CuC) was blended with 10Sc1CeSZ, powder in the ratio of 4:1 in weight to form an APS feeding stock which was sprayed onto a stainless steel substrate under conditions set forth on EXAMPLE 5. The sprayed CuC—ScSZ, that is CuC-10Sc1CeSZ, composite was then oxidized at 800° C. to remove the graphite, and was then reduced at 800° C. to convert CuO back to metallic Cu. The microstructure of prepared Cu-10Sc1CeSz anodes is displayed in schematic form in FIG. 6 based on the same type measurements used in EXAMPLE 5. The anode is highly porous forms a continuous path for electron conduction while 10Sc1CeSZ creates a network supporting Cu. Similar to the discussion in previous EXAMPLE 5, a functional Cu-10Sc1CeSZ anode is produced. FIG. 6 shows continuous Cu (diagonal hatch) 72 contact as interconnected, widely dispersed, flattened lamellae, interconnected, widely dispersed skeleton lamellae zirconia as 74 and widely dispersed internal pores (white areas) as 76. As can be seen, there is very substantial interconnected porosity flattened lamellae of Cu and zirconia and continuous Cu contact.

What is claimed is:
1. A method of depositing a fuel electrode anode onto a solid oxide electrolyte surface comprising the steps:
(1) providing a solid oxide electrolyte surface;
(2) mixing elemental copper powder having a particle size of from 44 micrometers to 74 micrometers, with a solid oxide electrolyte powder capable of conducting oxygen ions at temperatures below 1000° C., to provide a mixture, which mixture is oxidized to oxidize the copper component to CuO to provide a spray feedstock having a volume ratio of from about 1-2 parts by volume CuO per 1 part by volume electrolyte, and
(3) introducing the spray feedstock into a plasma jet of a plasma torch operating at a plume temperature between 2000° C. to 3000° C., to melt the spray feedstock and propel it onto the solid oxide electrolyte surface, where on contact with said surface droplets of the spray feedstock flatten into flattened lamellae, creating an anode coating having pore voids between the flattened lamellae upon solidification, and providing an anode coating having the approximate chemical composition Cu—

$(Sc_2O_3)_{0.1}(CeO_2)_{0.01}(ZrO_2)_{0.89}$, with greater than 35 vol. % Cu based on solids volume, as well as over 35 vol. % interconnected porosity and continuous electrically conducting Cu contact, and where the anode coating formed by plasma jet spraying is from 20 micrometers to 200 micrometers thick.

2. The method of claim 1, wherein the solid oxide electrolyte surface provided in step (1) comprises stabilized zirconia supported by an air electrode comprising a mixture of oxides selected from the group consisting of doped $LaMnO_3$, $CaMnO_3$, $LaNiO_3$ and $LaCrO_3$.

3. The method of claim 1, where, in step (2) the copper powder is mixed with solid oxide electrolyte powder and then the mixture is oxidized, and sieved to form copper oxide plus electrolyte where their volume ratio is in the range of from about 1-2 parts by vol. CuO per 1 part by vol. electrolyte, and where in step (3) the electrolyte coating after spraying is inserted into a heated reducing atmosphere to provide a Cu plus electrolyte anode coating.

4. The method of claim 3, wherein the elemental copper powder, that is mixed with solid oxide electrolyte powder is heat treated and oxidized in a plurality of steps and times at about 600° C. and then loosened and sieved followed by additional heat treatment and oxidation from 350° C. to 800° C. followed by additional loosening and sieving the produce copper oxide plus electrolyte.

5. A method of depositing a fuel electrode anode onto a solid oxide electrolyte surface comprising the steps:
  (1) providing a solid oxide electrolyte surface comprising stabilized zirconia supported by an air electrode comprising a mixture of oxides selected from the group consisting of doped $LaMnO_3$, $CaMnO_3$, $LaNiO_3$ and $LaCrO_3$; and then
  (2) mixing copper powder selected from the group consisting of elemental copper and copper coated graphite, having a particle size of from about 44 micrometers to about 74 micrometers, with solid oxide electrolyte powder capable of conducting oxygen ions at temperatures below 1000° C.; and then
  (3) oxidizing the mixture in air at temperatures below 800° C.; and then
  (4) grinding the oxidized powder, to provide a spray feedstock; and then
  (5) introducing the spray feedstock into a plasma jet of a plasma torch operating at a plume temperature between 2000° C. to 3000° C., to melt the spray feedstock and propel it onto the solid oxide electrolyte surface, where on contact with said surface droplets of the spray feedstock flatten into flattened lamellae, creating a coating having pore voids between the flattened lamellae upon solidification; and finally
  (6) reducing the coating; creating an anode coating having the approximate chemical composition $Cu-(Sc_2O_3)_{0.1}(CeO_2)_{0.01}(ZrO_2)_{0.89}$
providing an anode coating with greater than 35 vol. % Cu based on solids volume, over 35 vol. % interconnected porosity, and continuous electrically conducting Cu contact; and wherein the anode coating formed by plasma jet spraying is from 20 micrometers to 200 micrometers thick.

\* \* \* \* \*